Patented Dec. 30, 1952

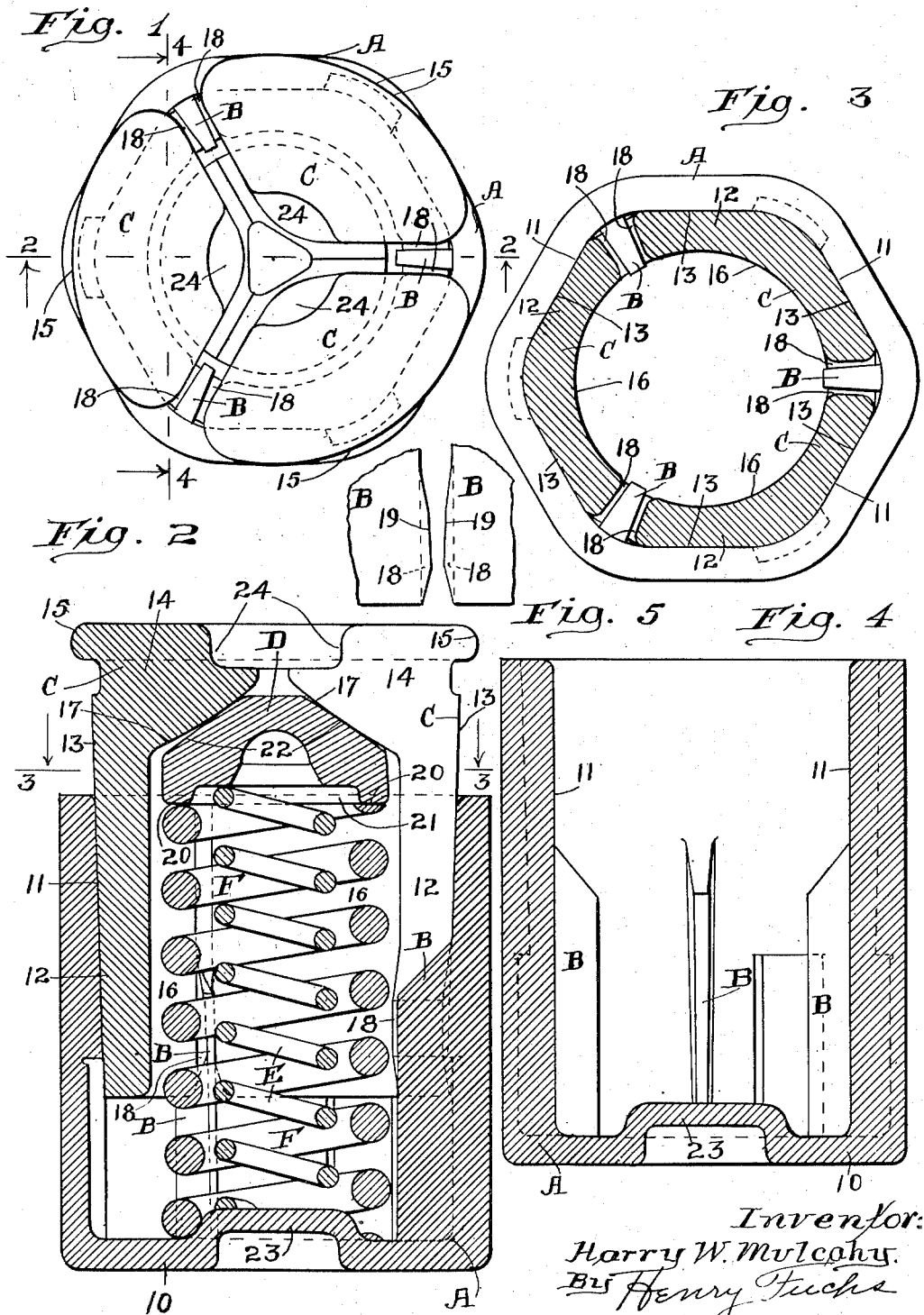
Dec. 30, 1952 — H. W. MULCAHY — 2,623,743
FRICTION SHOCK ABSORBER FOR RAILWAY CAR TRUCKS
Filed May 1, 1950
Inventor:
Harry W. Mulcahy.
By Henry Fuchs
Atty.

2,623,743

UNITED STATES PATENT OFFICE 2,623,743

FRICTION SHOCK ABSORBER FOR RAILWAY CAR TRUCKS

Harry W. Mulcahy, Chicago, Ill., assignor to W. H. Miner, Inc., Chicago, Ill., a corporation of Delaware Application May 1, 1950, Serial No. 159,286

3 Claims. (Cl. 267—9)

This invention relates to improvements in friction shock absorbers for dampening or snubbing the action of truck springs of railway cars.

The main object of the invention is to provide a friction shock absorber of the character indicated, comprising friction shoes slidingly telescoped within a friction casing, a combined wedge and spring follower member cooperating with the outer end portions of the shoes for spreading the same apart into tight frictional engagement with the interior walls of the casing, and spring means reacting between the casing and the combined wedge and spring follower member for forcing the latter against the shoes, wherein means in the form of guides on the casing engaging between adjacent shoes is provided for preventing lateral inward displacement of the shoes at their inner end portions, which might otherwise occur, due to the wedging pressure being applied to the outer ends of said shoes, and result in failure of the mechanism to operate properly due to binding of the shoes against the interior walls of the casing.

Other objects of the invention will more clearly appear from the description and claims hereinafter following.

In the accompanying drawing forming a part of this specification, Figure 1 is a top plan view of my improved shock absorber. Figure 2 is a transverse, vertical sectional view, corresponding substantially to the line 2—2 of Figure 1. Figure 3 is a horizontal sectional view, corresponding substantially to the line 3—3 of Figure 2. Figure 4 is a vertical sectional view of the friction casing only, said view corresponding substantially to the line 4—4 of Figure 1. Figure 5 is a broken view of portions of two adjacent friction shoes, illustrating the guide lugs of said shoes.

As shown in the drawing, my improved shock absorber comprises broadly a friction casing A, provided with interior guide ribs B—B—B, a set of three friction shoes C—C—C with which the guide ribs cooperate, a combined wedge and spring follower member D, an inner coil spring E, and an outer coil spring F.

The casing A is in the form of a tubular member of hexagonal, transverse cross section, open at its top and having a transverse bottom wall 10 closing the lower end thereof. The casing A is provided with three lengthwise extending, interior friction surfaces 11—11—11 which are of V-shaped, transverse cross section, each surface being formed by two adjacent walls of the hexagonal casing. The friction surfaces 11—11—11 extend downwardly from the open end of the casing, terminating short of the bottom end thereof, and converge inwardly of said casing, thus giving the latter a tapered formation.

The guide ribs B—B—B, which cooperate with the ribs shoes C—C—C, extend vertically, and are located at alternate corners of the casing, between adjacent of the V-shaped friction surfaces 11—11 thereof. The ribs B—B—B are radial to the central longitudinal axis of the mechanism. Each rib B extends upwardly from the bottom of the casing A to a point about midway between the top and bottom ends of the casing, that is, it extends upwardly beyond the lower end of the corresponding friction surface 11. Each rib is downwardly tapered from the top to the bottom end thereof, and is also tapered laterally inwardly. As shown in Figure 4, the top ends of the ribs B—B—B are beveled toward the casing walls.

The friction shoes C—C—C are telescoped within the casing A, and are arranged in annular series, being alternated with the guide ribs B—B—B of said casing. Each shoe C comprises a relatively heavy, platelike section 12, and a lengthwise extending, V-shaped friction surface 13 on its outer side engaged with the corresponding V-shaped friction surface 11 of the casing. At the top end thereof, the platelike section 12 of the shoe C has an inward enlargement or head 14 and a laterally outwardly projecting, horizontal flange 15 on its outer side. The flange 15 overhangs the upper end of the casing A and is adapted to shoulder against the latter to limit downward movement of the shoe. On the inner side thereof, the platelike section 12 of each shoe C presents a transversely curved surface 16. The head 14 of each shoe presents a wedge face 17 on its underneath side, which is inclined outwardly in downward direction. The wedge faces 17—17—17 of the three shoes diverge downwardly and are in wedging engagement with the combined wedge and spring follower member D. Each wedge face 17 is rounded or crowned lengthwise, so as to fulcrum or rock on the combined wedge and spring follower member D. Each shoe further has lateral guide lugs 18—18 at opposite sides, near the lower end thereof, which cooperate with the ribs B—B at opposite sides of the shoe and serve to guide the shoe between two adjacent ribs. As shown most clearly in Figure 5, the guide lugs 18—18 of adjacent shoes C—C have downwardly converging edge faces 19—19 which are correspondingly inclined to the opposite side faces of the corresponding guide rib B of the casing, which guide rib they embrace. As shown in Figure 3, the side faces of the guide lugs 18—18 of adjacent shoes converge laterally inwardly to correspond with the converging side faces of the laterally inwardly tapered portion of the embraced guide rib B of the casing. As will be evident, the longitudinally and laterally tapered formation of the ribs B and the correspondingly formed lugs 18—18 of the shoes C provide for accurate guiding of the shoes and to allow contraction of the shoes, as a set, to pass inwardly of the tapered casing. The ribs B—B—B and lugs 18—18, 18—18, and 18—18 of the three shoes have close sliding engagement with each other, thus preventing play between the shoes and the ribs, and blocking the shoes against lateral inward displacement at their lower ends, which otherwise might be induced by the lateral spreading action exerted on the outer ends of said shoes by the combined wedge and spring follower member D.

The combined wedge and spring follower member D is in the form of a block having a flat, transverse, bottom face 20 provided with a seat 21 for the upper end of the spring E. The upper end portion of the member D is provided with three upwardly converging wedge faces 22—22—22, which engage respectively with the wedge faces 17—17—17 of the shoes C—C—C. The wedge faces 22—22—22 are rounded or crowned lengthwise so as to have rocking engagement with the wedge faces of the shoes.

The springs E and F are in the forms of helical coils, the spring E being seated on an upstanding, hollow boss 23 on the bottom wall of the casing A and having its top end engaged in the seat 21 of the member D. The spring F surrounds the spring E and has its top and bottom ends bearing, respectively, on the bottom face 20 of the member D and the bottom wall 10 of the casing A. The boss 23 of the casing A serves to accommodate the usual spring centering lug of the bottom spring plate of a truck spring cluster of a railway car, and the heads 14—14—14 of the shoes C—C—C are cut out on their inner sides, as shown in Figure 2, to provide a seat 24 for the usual spring centering lug of the top spring plate of a truck spring cluster.

My improved shock absorber preferably replaces one or more of the spring units of a truck spring cluster of a railway car, being interposed between the top and bottom spring plates of said cluster.

The operation of my improved shock absorber is as follows: Upon the shoes C—C—C being forced inwardly of the casing A, they are wedged apart by the spring resisted, combined wedge and spring follower member D, thereby providing frictional resistance to absorb the shocks and dampen the action of the truck springs of a railway car. As the shoes C—C—C move inwardly of the casing, each shoe is guided between adjacent ribs B—B, thus restricting radial contraction of the set of shoes, to an extent to prevent inward tilting of the lower ends thereof, which might otherwise be induced by the spreading pressure exerted on the upper ends of said shoes, the tapered formation of the ribs B—B—B of the casing and inclination of the corresponding faces 19—19 of the lugs 18—18 of the shoes, compensating for the taper of the casing.

I claim:

1. In a friction shock absorber, the combination with a friction casing; of elongated friction shoes slidingly telescoped within the casing; lengthwise extending, interior guide ribs on said casing alternated with said shoes, each of said ribs extending between two adjacent shoes, said two adjacent shoes closely embracing said guide ribs, and adjacent ribs engaging opposite side edges of the shoe therebetween and holding the latter against inward tilting; a combined wedge and spring follower member, said member and shoes having engaging wedge faces; and spring means within said casing acting between the casing and said member for yieldingly opposing movement of said member inwardly of the casing.

2. In a friction shock absorber, the combination with a tapered friction casing; of elongated friction shoes slidingly telescoped within the casing; lengthwise extending, lengthwise tapered, interior guide ribs on said casing alternated with said shoes, each of said ribs extending between two adjacent shoes, said two adjacent shoes closely embracing said guide ribs; a combined wedge and spring follower member, said member and shoes having engaging wedge faces; and spring means within said casing reacting between said casing and said member for yieldingly opposing movement of said member inwardly of the casing.

3. In a friction shock absorber, the combination with a tapered friction casing; of elongated friction shoes slidingly telescoped within the casing; lengthwise extending, lengthwise tapered, interior guide ribs on said casing alternated with said shoes, each of said ribs extending between two adjacent shoes, said two adjacent shoes having laterally projecting guide lugs thereon, said guide lugs having opposed, inclined edge faces closely embracing said guide ribs; a combined wedge and spring follower member, said member and shoes having engaging wedge faces; and spring means within said casing reacting between said casing and member for yieldingly opposing movement of said member inwardly of the casing.

HARRY W. MULCAHY.

REFERENCES CITED

The following references are of record in the file of this patent:

UNITED STATES PATENTS

| Number | Name | Date |
|---|---|---|
| 754,670 | Miner | Mar. 15, 1904 |
| 992,442 | O'Connor | May 16, 1911 |
| 2,238,220 | Gallagher | Apr. 15, 1941 |
| 2,276,228 | Cottrell | Mar. 10, 1942 |
| 2,429,672 | Dath | Oct. 28, 1947 |